(12) United States Patent
Elshafie et al.

(10) Patent No.: US 11,641,652 B2
(45) Date of Patent: May 2, 2023

(54) UPLINK CONTROL INFORMATION TRANSMISSION FORMAT SELECTION

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/239,147

(22) Filed: Apr. 23, 2021

(65) Prior Publication Data
US 2022/0346084 A1 Oct. 27, 2022

(51) Int. Cl.
*H04W 72/04* (2009.01)
*H04L 1/00* (2006.01)
*H04W 80/02* (2009.01)

(52) U.S. Cl.
CPC ....... *H04W 72/0413* (2013.01); *H04L 1/0006* (2013.01); *H04W 72/042* (2013.01); *H04W 80/02* (2013.01)

(58) Field of Classification Search
CPC ........... H04W 72/0413; H04W 72/042; H04W 80/02; H04L 1/0006
USPC ........................................................ 370/329
See application file for complete search history.

(56) References Cited

U.S. PATENT DOCUMENTS

| 5,737,326 A * | 4/1998 | I .............................. H04B 1/709 370/335 |
|---|---|---|
| 2017/0318593 A1* | 11/2017 | Eriksson ................ H04W 72/08 |
| 2019/0357204 A1* | 11/2019 | Matsumura ............. H04J 13/16 |
| 2020/0322199 A1* | 10/2020 | Matsumura ......... H04W 72/085 |
| 2021/0367729 A1 | 11/2021 | Huang et al. |

OTHER PUBLICATIONS

International Search Report and Written Opinion—PCT/US2022/071657—ISA/EPO—dated Jul. 6, 2022.
(Continued)

*Primary Examiner* — Chi Tang P Cheng
(74) *Attorney, Agent, or Firm* — Muncy, Geissler, Olds & Lowe, P.C.

(57) ABSTRACT

Disclosed are techniques for wireless communication. In an aspect, a method, performed by a network node, for selection of uplink control information (UCI) transmission format, comprises determining whether to use a coherent transmission; upon determining to use a coherent transmission, selecting a coherent transmission format for UCI transmission. Upon determining not to use a coherent transmission the method further includes determining whether to use an orthogonal sequence: upon determining to use an orthogonal sequence, the method includes selecting a non-coherent transmission format with an orthogonal sequence for UCI transmission; upon determining not to use an orthogonal sequence, the method includes selecting a non-coherent transmission format with a non-orthogonal sequence for UCI transmission. The method further includes using the selected format for UCI transmission. For example, a base station may send the selected format for UCI transmission to a UE, or a UE may select and use the UCI transmission format.

30 Claims, 12 Drawing Sheets

(56) References Cited

OTHER PUBLICATIONS

Nokia Networks: "Dynamic adaptation of HARQ-ACK feedback size and PUCCH format", 3GPP Draft, 3GPP TSG-RAN WG1#81, R1-152810, 3rd Generation Partnership Project (3GPP), Mobile Competence Centre,650, Route Des Lucioles ; F-06921 Sophia-Antipolis Cedex ; France, vol. RAN WG1, No. Fukuoka, Japan; May 25, 2015-May 29, 2015 May 24, 2015 (May 24, 2015), XP050969963, 3 Pages, sections I-IV.

Nokia Networks: "Dynamic PUCCH Format Adaptation", 3GPP TSG-RAN WG1 Meeting #83, R1-157126, 3rd Generation Partnership Project, Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015, XP051003394, 3 Pages, Section 2.

Qualcomm Incorporated: "Potential Coverage Enhancement Techniques for PUCCH", 3GPP Draft, 3GPP TSG-RAN WG1 Meeting #103e, R1-2009802, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 17, 2020, (Nov. 17, 2020), XP051955627, 27 Pages, Paragraph [3. Enhancing Beam switching Reliability], Sections 2.1, 2.2 and 2.3.

\* cited by examiner

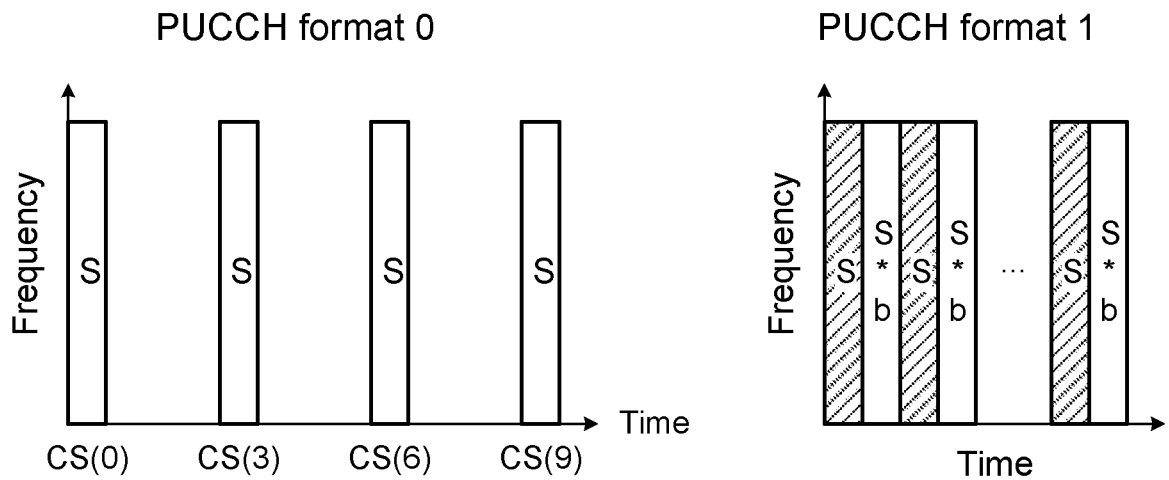
FIG. 4A
FIG. 4B
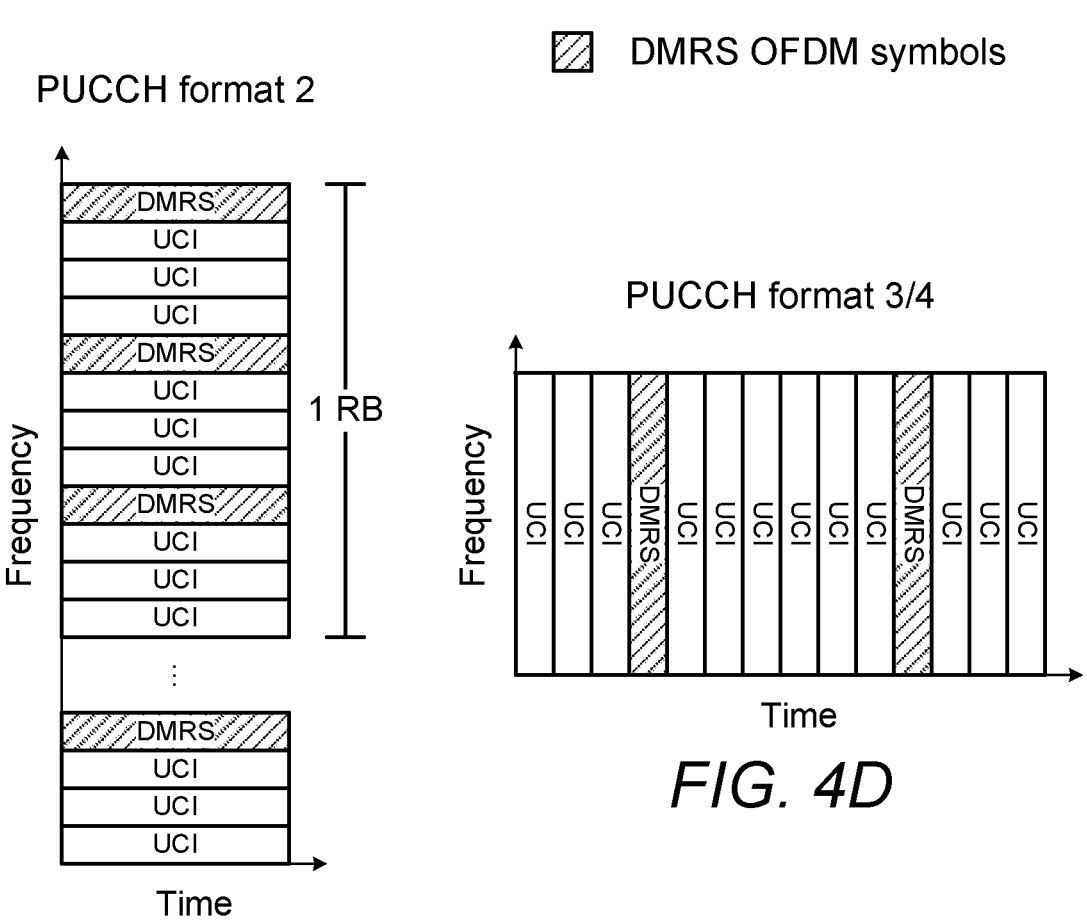
FIG. 4C
FIG. 4D

UPLINK CONTROL INFORMATION TRANSMISSION FORMAT SELECTION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes determining whether to use a coherent transmission; upon determining to use a coherent transmission, selecting a coherent transmission format for UCI transmission; upon determining not to use a coherent transmission: determining whether to use an orthogonal sequence; upon determining to use an orthogonal sequence, selecting a non-coherent transmission format with an orthogonal sequence for UCI transmission; upon determining not to use an orthogonal sequence, selecting a non-coherent transmission format with a non-orthogonal sequence for UCI transmission; and using the selected format for UCI transmission.

In an aspect, a network node includes a memory; a communication interface; and at least one processor communicatively coupled to the memory and the communication interface, the at least one processor configured to: determine whether to use a coherent transmission; upon determining to use a coherent transmission, selecting a coherent transmission format for UCI transmission; upon determining not to use a coherent transmission: determining whether to use an orthogonal sequence; upon determining to use an orthogonal sequence, selecting a non-coherent transmission format with an orthogonal sequence for UCI transmission; upon determining not to use an orthogonal sequence, selecting a non-coherent transmission format with a non-orthogonal sequence for UCI transmission; and use the selected format for UCI transmission.

In an aspect, a network node includes means for determining whether to use a coherent transmission, upon determining to use a coherent transmission, selecting a coherent transmission format for UCI transmission, and, upon determining not to use a coherent transmission, determining whether to use an orthogonal sequence, upon determining to use an orthogonal sequence, selecting a non-coherent transmission format with an orthogonal sequence for UCI transmission, and upon determining not to use an orthogonal sequence, selecting a non-coherent transmission format with a non-orthogonal sequence for UCI transmission; and means for using the selected format for UCI transmission.

In an aspect, a non-transitory computer-readable medium storing computer-executable instructions that, when executed by a network node, cause the network node to: determine whether to use a coherent transmission; upon determining to use a coherent transmission, select a coherent transmission format for UCI transmission; upon determining not to use a coherent transmission, determine whether to use an orthogonal sequence; upon determining to use an orthogonal sequence, select a non-coherent transmission format with an orthogonal sequence for UCI transmission; upon determining not to use an orthogonal sequence, select a non-coherent transmission format with a non-orthogonal sequence for UCI transmission; and use the selected format for UCI transmission.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 4A-4D illustrate different PUCCH formats.

DETAILED DESCRIPTION

Figure 1:
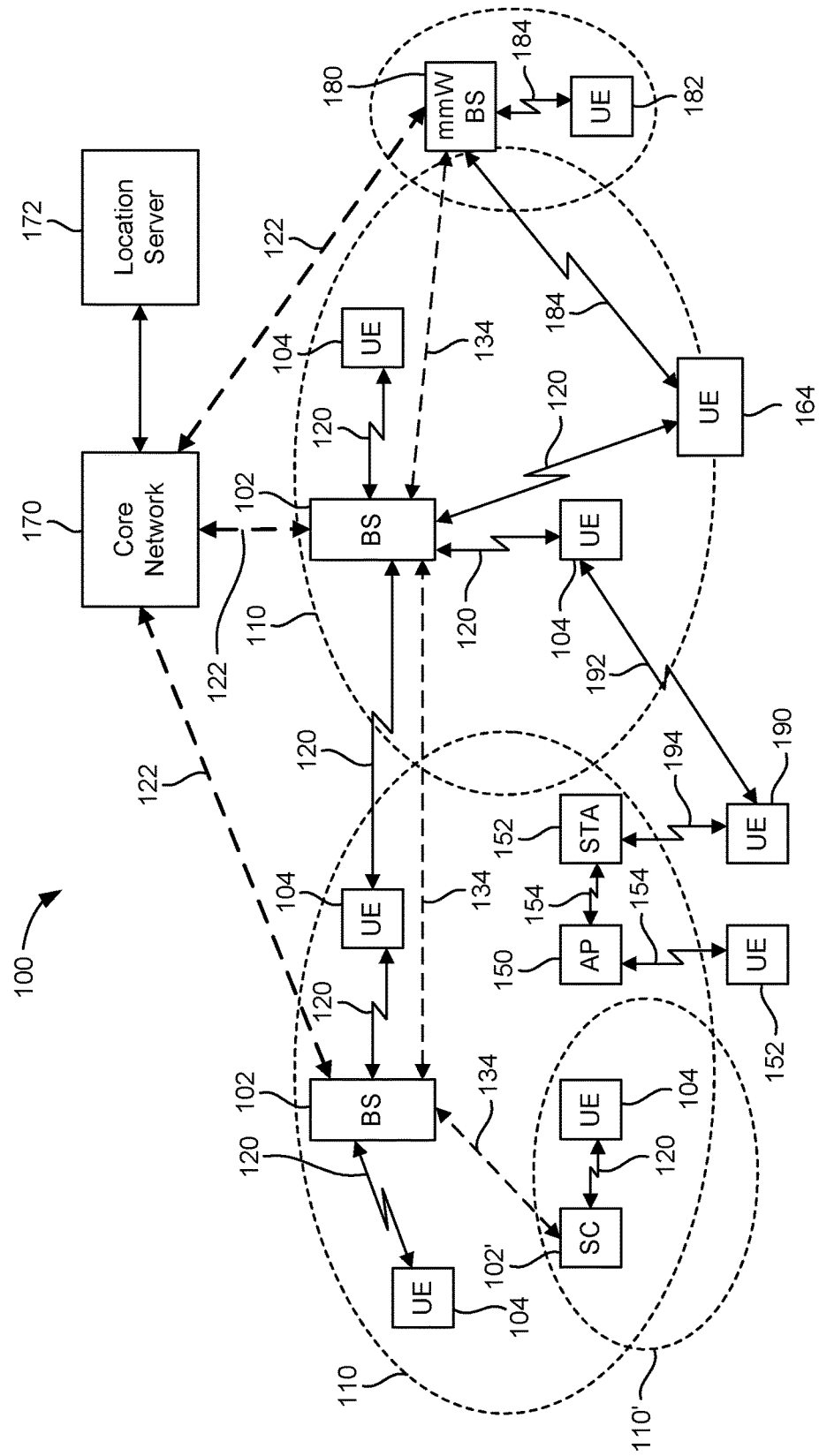
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum.

EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
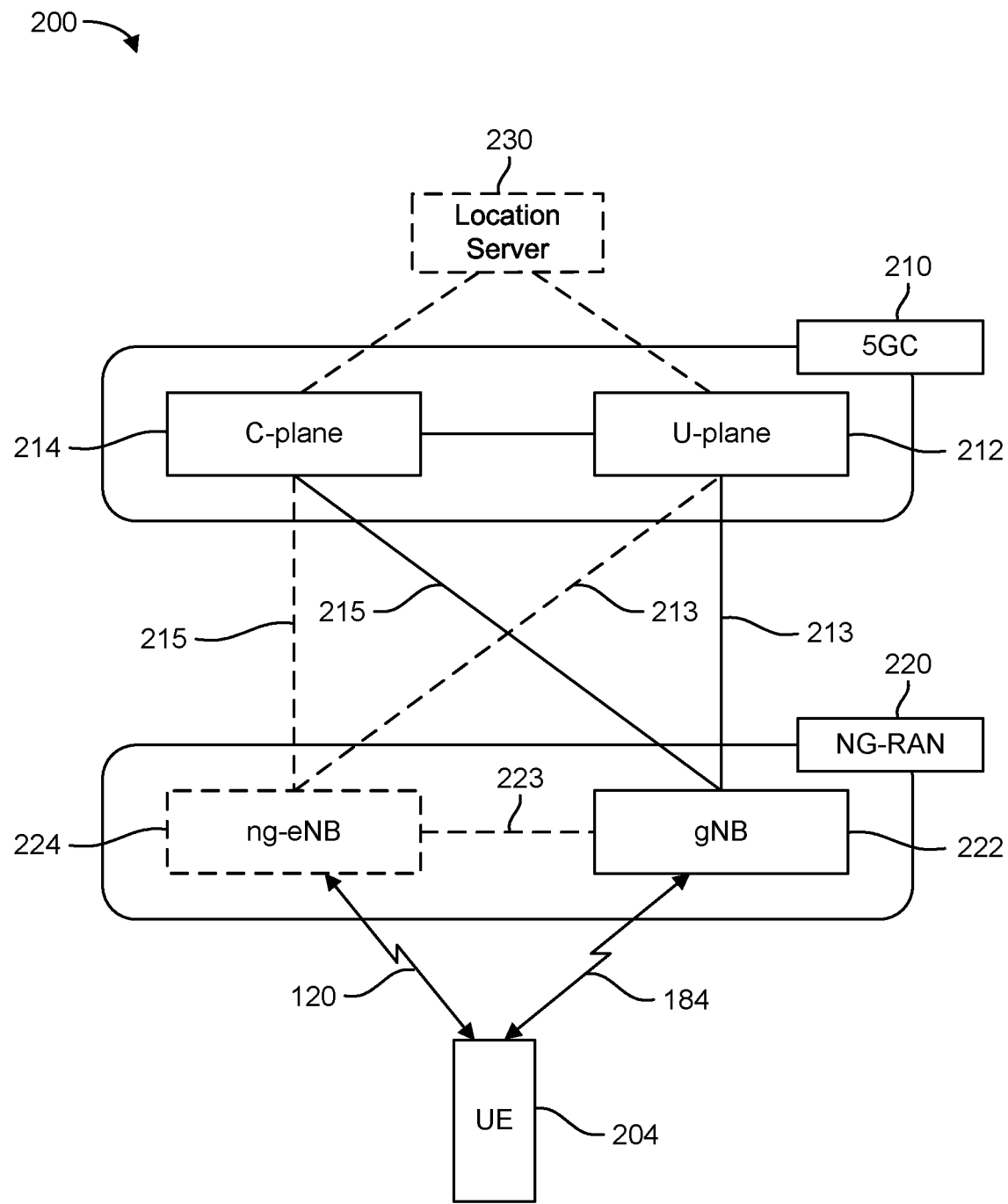
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
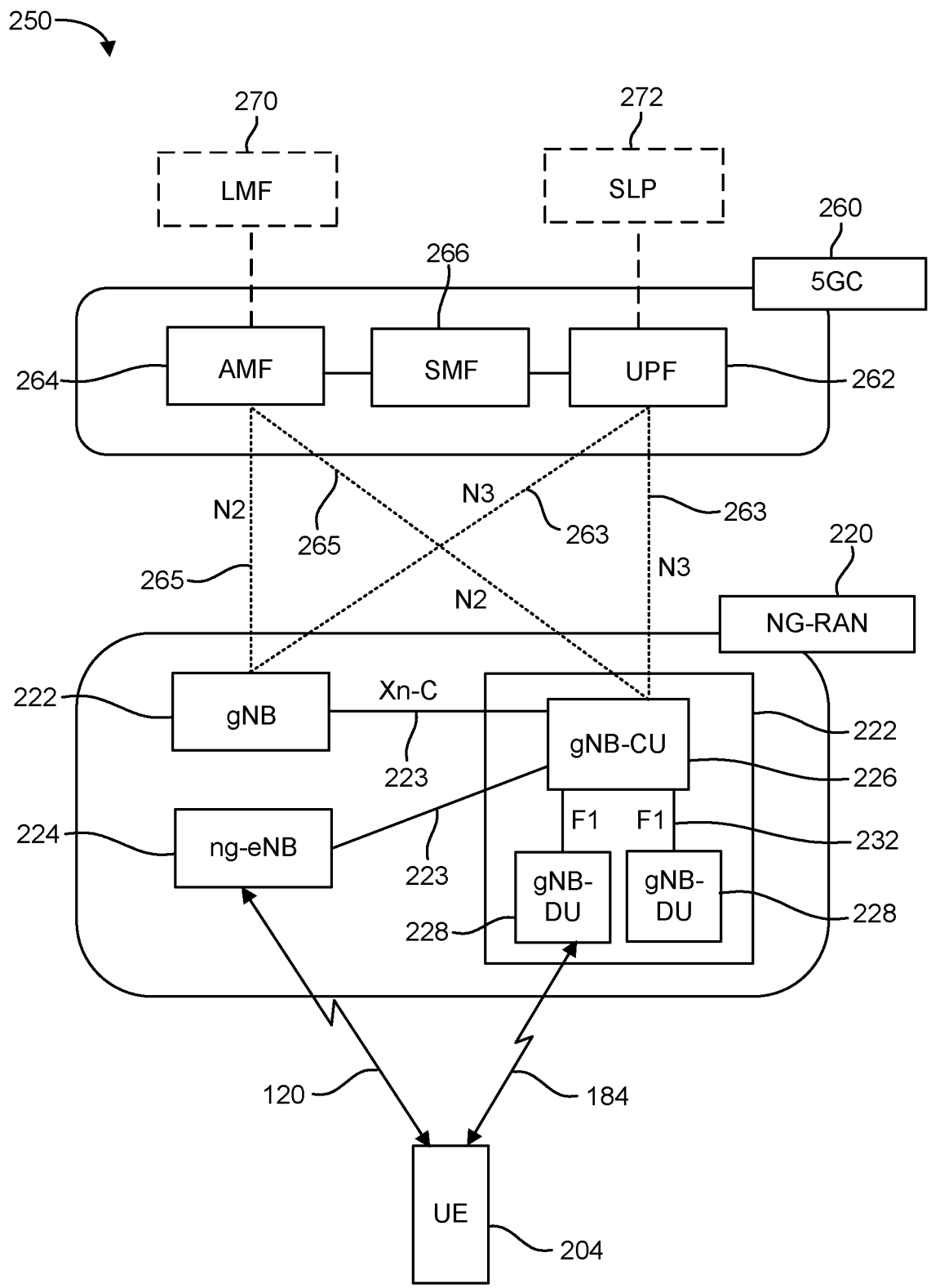

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
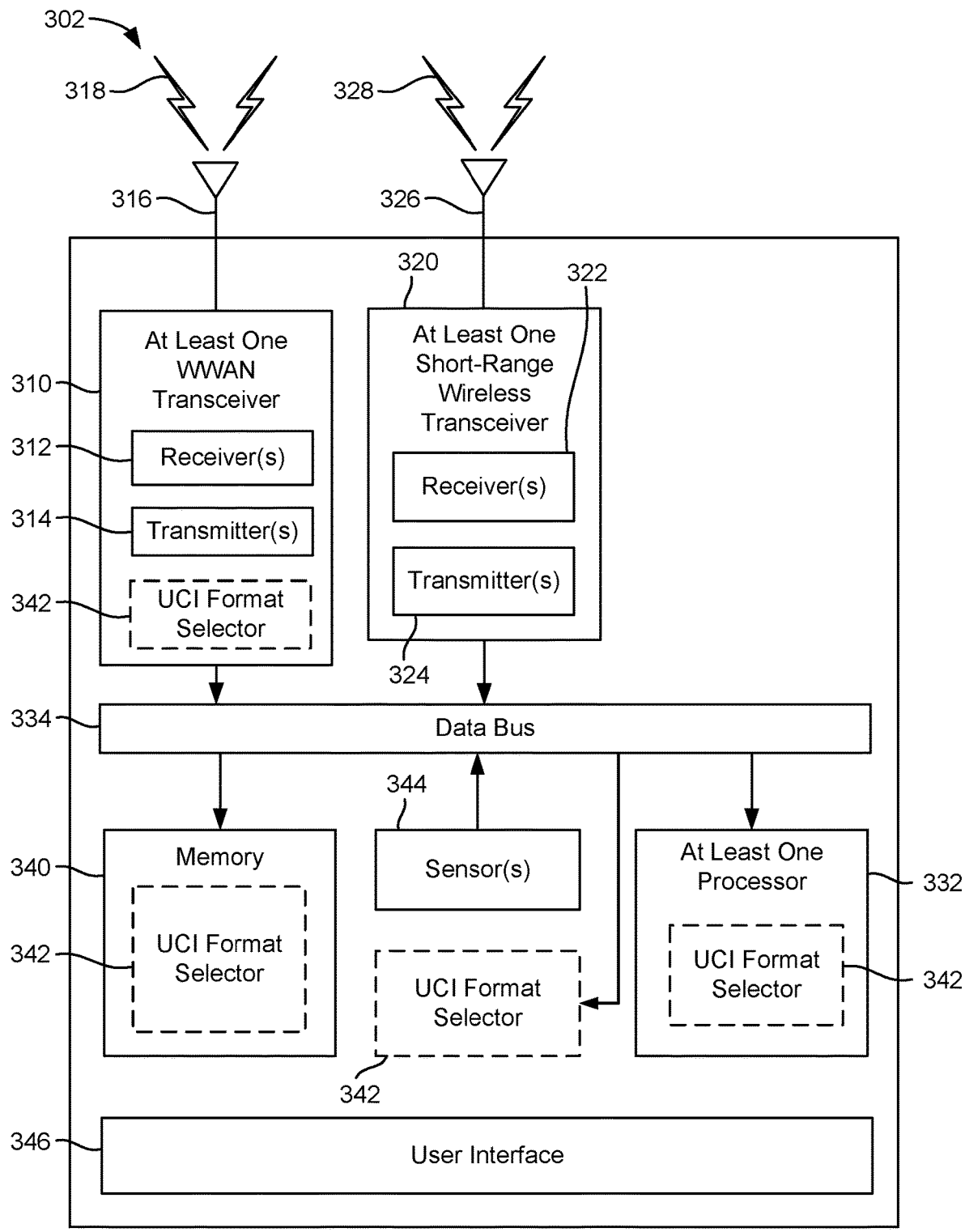
FIGS. 3A to 3C are simplified block diagrams of several sample aspects of components that may be employed in a user equipment (UE), a base station, and a network entity, respectively, and configured to support communications as taught herein.
Figure 3B:
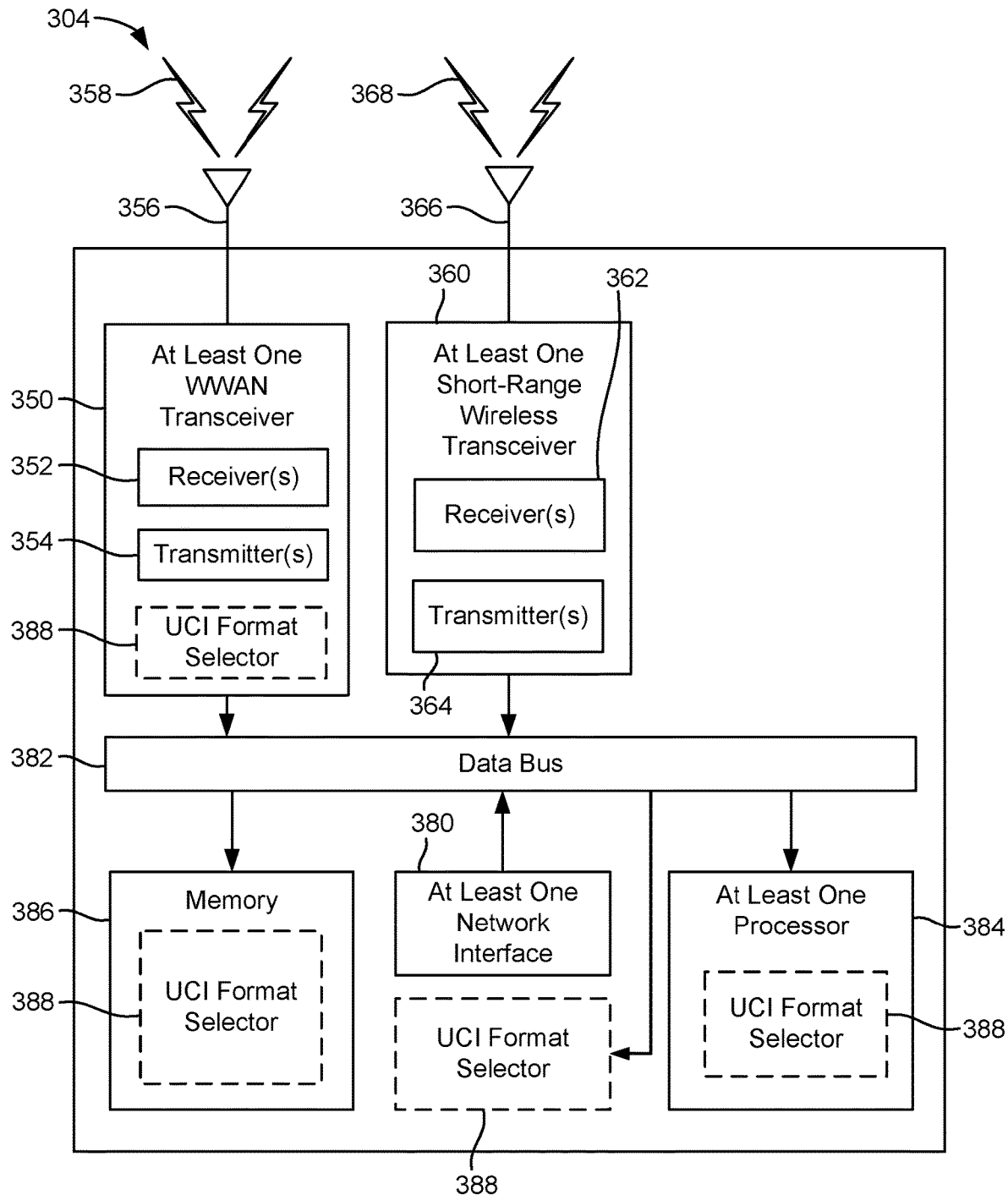
Figure 3C:
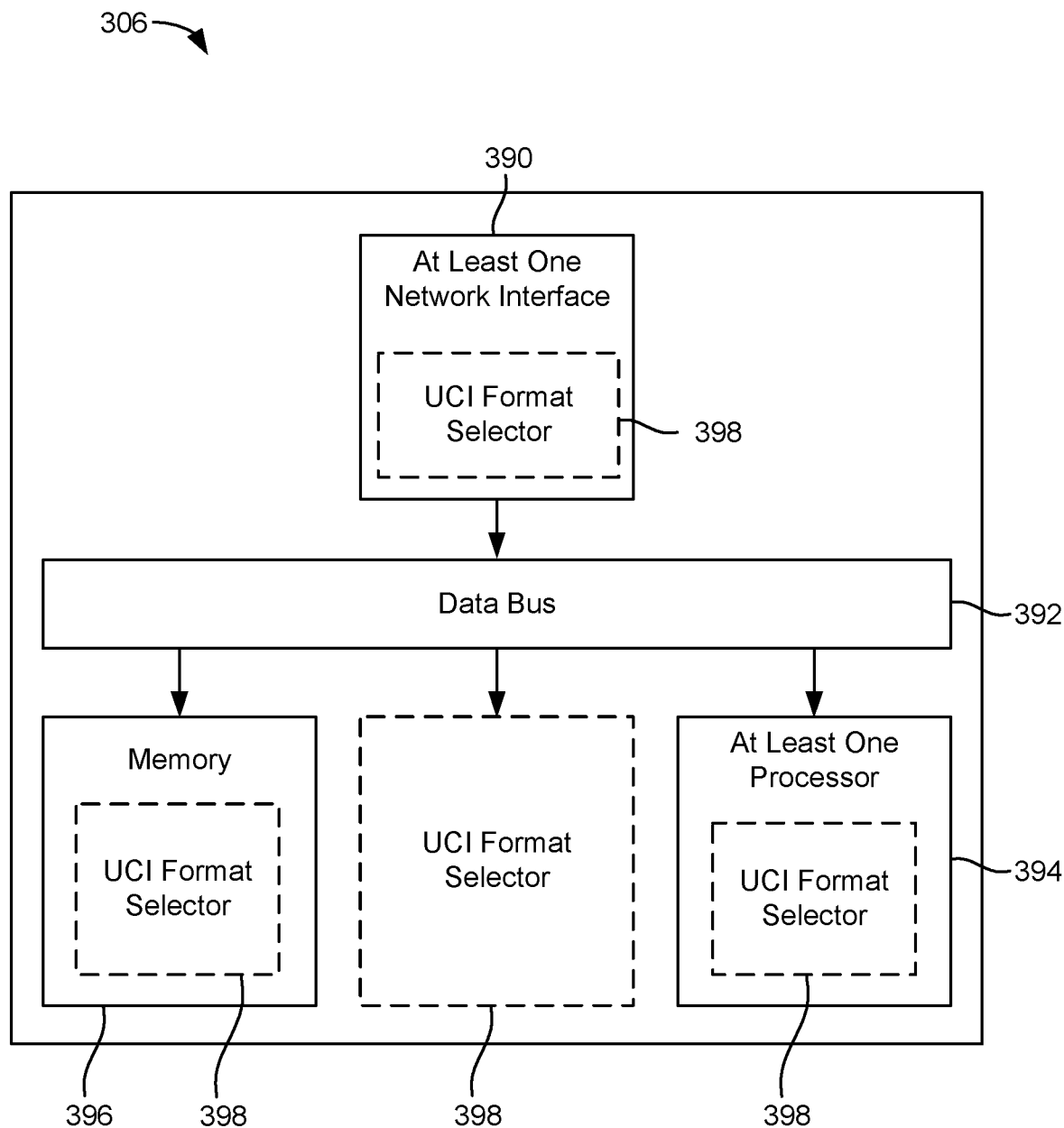

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include UCI format selectors 342, 388, and 398, respectively. The UCI format selectors 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the UCI format selectors 342, 388, and 398 may be external to the processors 332, 384, and 394 (e.g., part of a modem processing system, integrated with another processing system, etc.). Alternatively, the UCI format selectors 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the UCI format selector 342, which may be, for example, part of the at least one WWAN transceiver 310, the memory component 340, the at least one processor 332, or any combination thereof, or may be a standalone component. FIG. 3B illustrates possible locations of the UCI format selector 388, which may be, for example, part of the at least one WWAN transceiver 350, the memory component 386, the at least one processor 384, or any combination thereof, or may be a standalone component. FIG. 3C illustrates possible locations of the UCI format selector 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, and/or the at least one short-range wireless transceiver 320. By way of example, the sensor(s) 344 may include an accelerometer (e.g., a micro-electrical mechanical systems (MEMS)

device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the UCI format selectors 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Many wireless systems use a demodulation reference signal (DMRS) to help the receiver estimate channel conditions. The estimated channel is used for, among other purposes, performing demodulation. A sender transmits DMRS along with the data and a receiver receives based on channel estimation followed by coherent demodulation, decoding, or both. As used herein, the term "coherent transmission" refers to a transmission which includes a DMRS, and the term "non-coherent transmission" refers to a transmission which does not include a DMRS.

DMRS-based communication, however, may be suboptimal in low SNR conditions. The energy spent on DMRS does not contain any useful information, and, in low SNR conditions, the accuracy of the channel estimation may be poor, leading to significant performance degradation during demodulation and decoding. Thus, at low SNR, noncoherent transmission (without DMRS) can have better results than coherent transmission (with DMRS). This concept applies, for example, to transmission on a physical uplink control channel (PUCCH).

FIGS. 4A-4D illustrate different PUCCH formats.

FIG. 4A shows PUCCH format 0, in which 1-2 bits of payload are transmitted on 1-2 OFDM symbols, using different cyclic shifts (e.g., 0, 3, 6, and 9) of a base sequence S. PUCCH format 0 does not contain DMRS.

FIG. 4B shows PUCCH format 1, in which 1-2 bits of payload are transmitted on 4-14 OFDM symbols, using base sequence S * up to four codepoints. PUCCH format 1 includes the sequence Sin every symbol, but for the UCI symbols the data b is multiplied with the sequence S. The ratio of DMRS to UCI is 1:1.

FIG. 4C shows PUCCH format 2, in which more than 2 bits of payload are transmitted on 1-2 OFDM symbols, with frequency division multiplexing (FDM) of DMS and QPSK modulated uplink control information (UCI).

FIG. 4D shows PUCCH formats 3 and 4, in which more than 2 bits of payload are transmitted on 4-14 ODFM symbols, with time division multiplexing (TDM) of DMRS and QPSK modulated UCI. The PUCCH formats 3 and 4 are enhancements on PUCCH format 1 by allowing a DMRS to UCI ratio of 1:2, 1:3, 1:4, etc.

One approach to support non-coherent PUCCH is to define new PUCCH formats for that purpose. For example, PUCCH format 1A could be defined to be the same as PUCCH format 1 except that without a DMRS, e.g., DMRS symbols may be used for UCI instead; PUCCH format 2A could be defined to be the same as PUCCH format 2 except with UCI occupying frequencies that are occupied by DMRS in format 2; and so on. Since PUCCH format 0 does not contain DMRS symbols, there is no need for a PUCCH format 0A. In this approach, the serving gNB could configure PUCCH resources with different formats to a UE, e.g., using a PUCCH resource indicator (PRI) to switch between resources, which may include switching between coherent and non-coherent PUCCH. Another approach to support non-coherent PUCCH is to add a flag (e.g., one bit) to the downlink control information (DCI) to switch between coherent and non-coherent transmission on the PUCCH resource pointed to by the PRI. These approaches enable dynamically indicated PUCCH such as HARQ acknowledgement (HARQ-ACK). The same approaches can be applied to semi-static PUCCH such as periodic channel state information (P-CSI), where signaling is via radio resource control (RRC) instead of using the PRI in DCI.

Another issue is whether to use orthogonal or non-orthogonal sequences during non-coherent PUCCH transmission. Given an assigned PUCCH resource, e.g., a time and frequency grid such as a resource block (RB), k bits of UCI payload may be transmitted by the following method. The UE constructs a sequence codebook with size $2^k$. To transmit a payload of k bits, e.g., $b_0 b_1 b_1 \ldots b_{(k-1)}$, the UE converts the payload bit steam $b_0 b_1 b_1 \ldots b_{(k-1)}$ into a decimal number K, then transmit the Kth codepoint in the constructed codebook. For a grid of M frequency tones and N OFDM symbols, using orthogonal sequences, the codebook maximum size is N*M, meaning that at most floor(log 2(N*M)) bits can be transmitted. In contrast, using non-orthogonal sequences, the codebook size can be larger than N*M, meaning that the max UCI payload size can be larger than floor(log 2(N*M)).

Yet another issue is how semi-persistent scheduling (SPS) configurations, and periodic traffic such as voice over IP (VoIP) or videos, should be factored into the selection between coherent, non-coherent orthogonal, and non-coherent non-orthogonal PUCCH.

Figure 5:
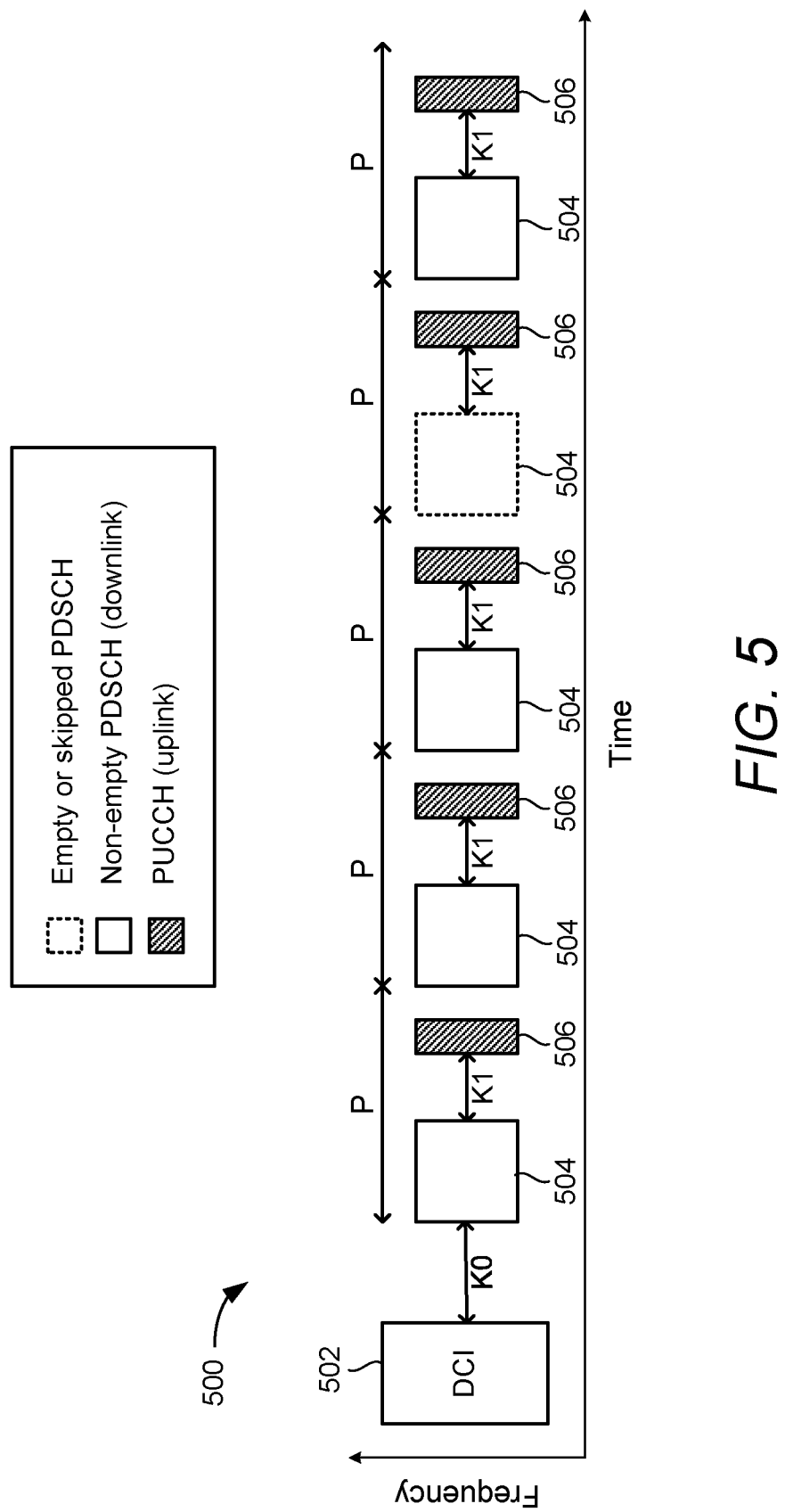
FIG. 5 is a time and frequency plot illustrating an example SPS physical downlink shared channel (PDSCH) configuration.

FIG. 5 is a time and frequency plot 500 illustrating an example SPS physical downlink shared channel (PDSCH) configuration. In FIG. 5, a DCI 502 may configure a dynamic grant (DG) that will happen after some delay K0 after the DCI. In FIG. 5, the DG sets up SPS PDSCH transmissions 504 having a periodicity P that defines the time between one SPS PDSCH occasion and the next SPS PDSCH occasion, and having a parameter K1 that specifies the number of time slots between receiving a PDSCH and sending a PUCCH 506 that contains a HARQ ACK or NACK and that optionally also contains CSI.

Figure 6:
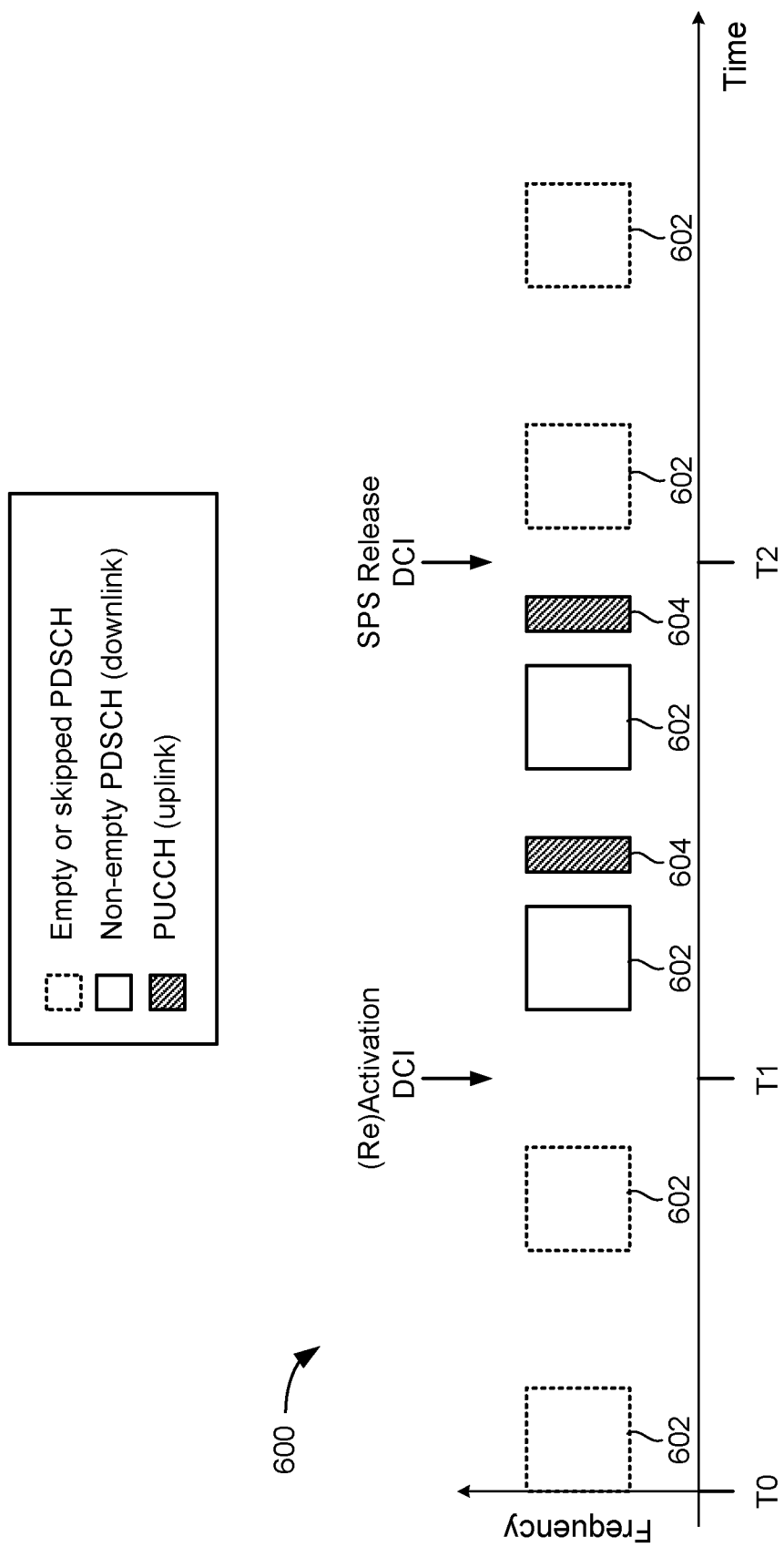
FIG. 6 is a time frequency plot illustrating activation and deactivation of an SPS configuration.

FIG. 6 is a time frequency plot 600 illustrating activation and deactivation of an SPS configuration. FIG. 6 illustrates the point that a UE may have SPS configurations that are activated, reactivated, or deactivated by RRC signaling. In FIG. 6, at time T0, the UE does not monitor the PDSCH occasions 602 because the SPS configuration is not active yet. At time T1, the gNB sends an activation DCI to activate certain configured SPS. In the activation DCI, the gNB may indicate transmit parameters, such as the modulation and coding scheme (MCS), RB allocation, and antenna ports of the SPS transmission. The gNB may use a reactivation DCI to change some or all of these parameters, or other parameters. Starting from time T1, the UE monitors the PDSCH occasions 602 and generates a PUCCH 604 containing the HARQ ACK or NACK. (For brevity of description, "ACK or NACK" may herein be abbreviated as "A/N" or simply "AN".) For a reactivation DCI, the UE starts to monitor the PDSCH occasions using the updated parameters. At time T2, the gNB uses an SPS release DCI to deactivate the configured SPS. Starting from time T2, the UE stops monitoring the subsequent PDSCH occasions 602.

Figure 7:
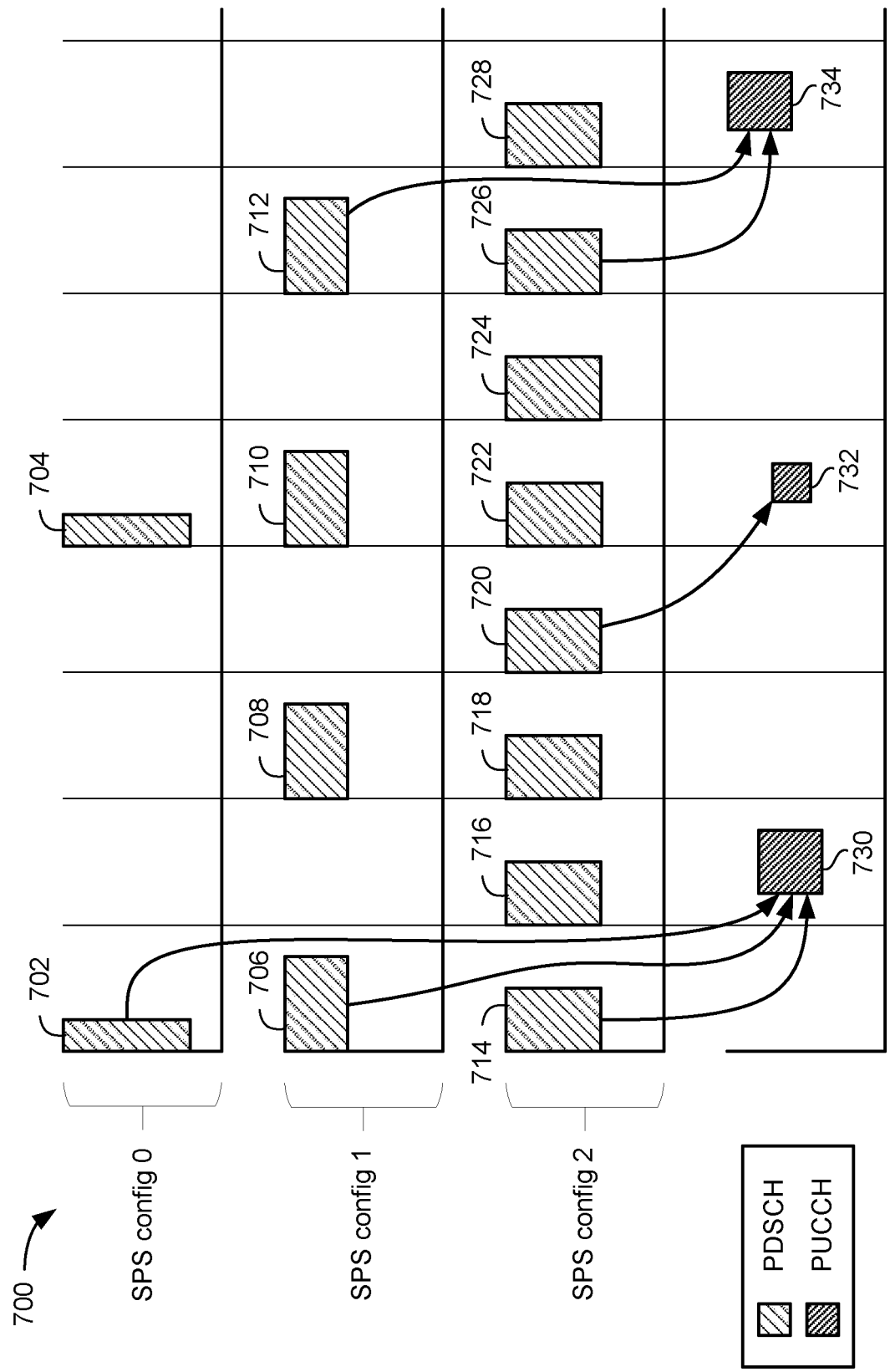
FIG. 7 illustrates examples of multi-downlink semi-persistent scheduled ACK/NACK in PUCCH.

FIG. 7 illustrates yet another issue that may affect the selection between coherent, non-coherent orthogonal, and non-coherent non-orthogonal PUCCH, multi-DL-SPS-AN. FIG. 7 illustrates an example 700 in which there are three SPS configurations, labeled SPS config 0-2 in FIG. 7. SPS config 0 includes PDSCH occasions 702 and 704; SPS config 1 includes PDSCH occasions 706, 708, 710, and 712; and SPS config 2 includes PDSCH occasions 714, 716, 718, 720, 722, 724, 726, and 728. In example 700, there is a multi-DL-SPS-AN PUCCH resource 730, a single-DL-SPS-AN PUCCH resource 732, and another multi-DL-SPS-AN PUCCH resource 734. A UE must send an ACK or NACK for every SPS downlink transmission that it receives, but sometimes the UE can't send the A/N immediately and instead accumulates A/Ns for multiple SPS DL transmissions.

In the example illustrated in FIG. 7, multi-DL-SPS-AN PUCCH resource 730 returns HARQ A/Ns from PDSCH occasions 702, 706, and 714, single DL-SPS-AN PUCCH resource 732 returns HARQ A/Ns from PDSCH occasion 720, and multi-DL-SPS-AN PUCCH resource 734 returns HARQ A/Ns from PDSCH occasions 712 and 726. Other PDSCH occasions may have PUCCH resources for their HARQ A/Ns, but these are omitted from FIG. 7 for clarity.

Thus, for a UE that can support both coherent and non-coherent PUCCH, the issues to be addressed include: how to signal that UE to switch between coherent and non-coherent PUCCH; how to determine whether to use orthogonal or non-orthogonal sequences in the case of non-coherent PUCCH; and how to take into account SPS configurations during this decision-making process. For example, each SPS configuration is associated with a priority (e.g., high or low). For example, an ultra-reliable low latency communication (URLLC) device may have high priority. Also, a DG which has high priority could be multiplexed with SPS feedback.

Techniques for selection of a UCI transmission format are herein presented. Selection of coherent PUCCH, non-coherent PUCCH with orthogonal sequences, or non-coherent PUCCH with non-orthogonal sequences may be based upon one or more criteria, including but not limited to: the number of HARK A/N to be reported; the number of high priority HARQ A/N to be reported; the TDD pattern being used in the cell; the average delay that an A/N response has incurred at a UE and for an SPS (which may be averaged across multiple SPSs); resource sizes, which may inform a decision between orthogonal or non-orthogonal sequences; UE transmit power; path loss; doppler and delay spread, and other channel characteristics. In some aspects, the gNB, the UE, or both may decide or agree on some mapping between these criteria and decisions on coherent versus non-coherent and orthogonal sequences versus non-orthogonal sequences. In some aspects, a gNB may further consider information normally not available to the UE, including, but not limited to, the number of users currently being served in the network and the anticipated number of bits (e.g., UL bits, DL bits, UL and DL bits, number of A/N bits to be reported, etc.) of all users. These techniques will now be presented in more detail.

Figure 8:
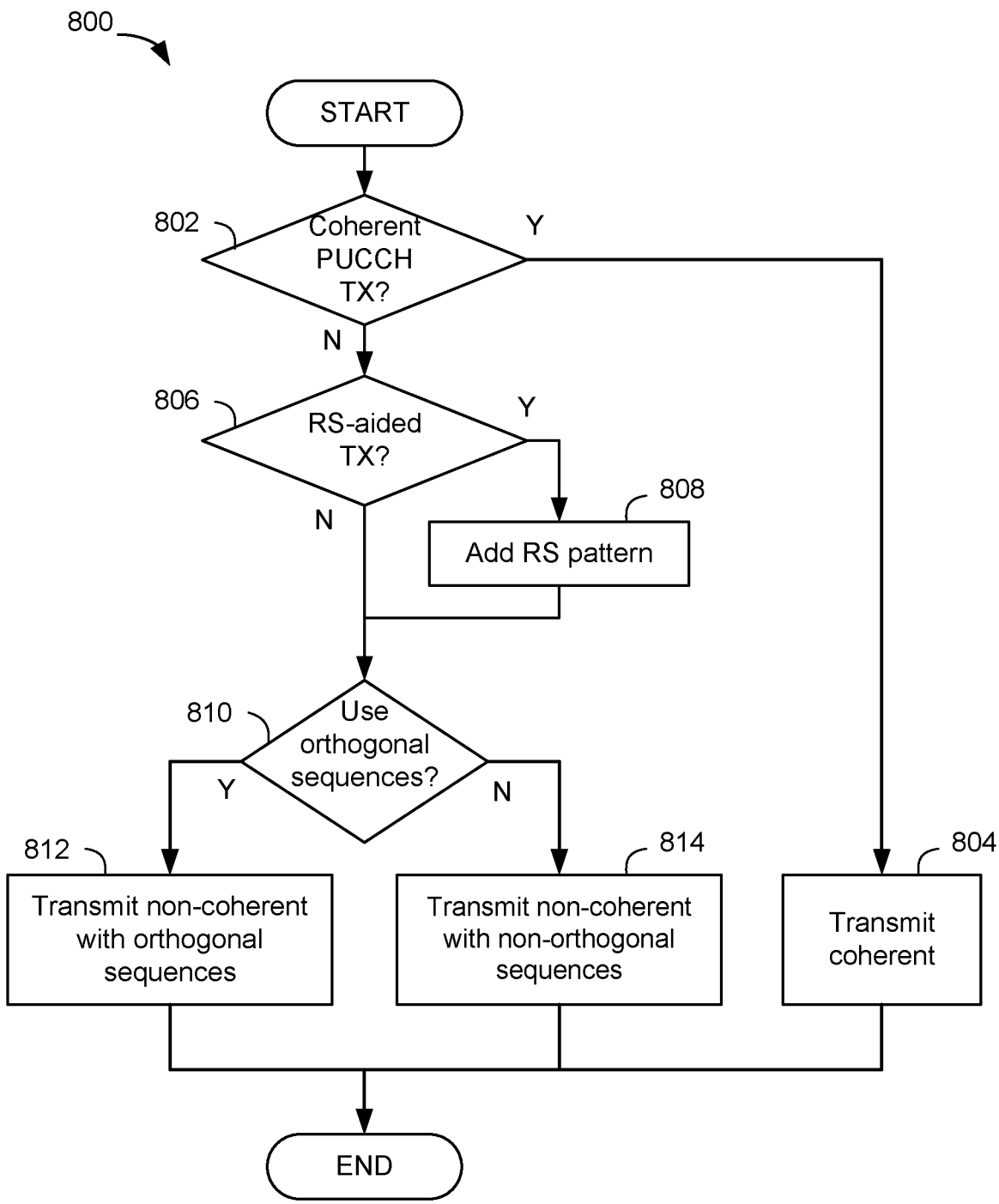
FIG. 8 is a flowchart of an example process associated with selection of a UCI transmission format according to some aspects of the disclosure.

FIG. 8 is a flowchart of an example process 800 associated with selection of a UCI transmission format according to some aspects of the disclosure. In some aspects, one or more process blocks of FIG. 8 may be performed by a base station (e.g., BS 102) and the result of the decision process signaled to a UE (e.g., UE 104). In some aspects, one or more process blocks of FIG. 8 may be performed by another device or a group of devices separate from or including the base station. Additionally, or alternatively, one or more process blocks of FIG. 8 may be performed by one or more components of the base station 304, such as the at least one processor 384, the at least one WWAN transceiver 350, the at least one short-range wireless transceiver 360, the at least one network interface(s) 380, or UCI format selector(s) 388, any or all of which may be considered means for performing this operation. In some aspects, one or more process blocks of FIG. 8 may be performed by a UE (e.g., UE 104) and the result of the decision process indicated to a base station 102, used during transmission of the next PUCCH by the UE 104, or combinations thereof.

As shown in FIG. 8, process 800 may include determining whether or not to transmit a coherent PUCCH (block 802). Means for performing the operation at block 802 may include the at least one processor 384 of the base station 304.

In some aspects, selection between coherent and non-coherent PUCCH may be based at least in part on channel conditions, such as path low, SNR, doppler and delay spread. For example, if a UE is operating in a low SNR environment, a non-coherent PUCCH may be selected by the at least one processor 384 of the base station 304.

Upon determining, at block 802, to transmit a coherent PUCCH, the process 800 may include selecting a coherent transmission (block 804), e.g., a coherent PUCCH. Means for performing the operation at block 804 may include the at least one WWAN transceiver 350 of base station 304. For example, transmitter(s) 354 of the base station 304 may transmit an indication to a UE that coherent PUCCH with orthogonal sequences should be used. This indication may be signaled to the UE via RRC, via a medium access control (MAC) control element (CE), or via DCI signaling. Where the selection is being performed by a UE, such as the UE 302, the UE 302 may transmit the coherent PUCCH via transmitter(s) 314.

Upon determining, at block 802, not to transmit a coherent PUCCH, process 800 may include determining whether or not to perform a RS-aided transmission (block 806). Means for performing the operation at block 806 may include the at least one processor 384 of the base station 304. In some aspects, a decision whether to perform a RS-aided transmission may be based, for example, on channel conditions, reliability requirements, or other criteria. For example, where there is a large doppler and delay spread, a RS-aided transmission may be selected by the at least one process 384 of the base station 304; the additional reference signals included in the PUCCH are useful for timing and synchronization purposes.

Upon determining, at block 806, to perform a RS-aided transmission, process 800 may include adding a RS pattern (block 808). Means for performing the operation at block 808 may include the at least one processor 384 of base station 304. For example, a base station may decide to add a tracking RS (TRS) or another reference signal to the transmit pattern.

As shown in FIG. 8, process 800 may further include determining whether or not to use orthogonal sequences (block 810). Means for performing the operation at block 810 may include the at least one processor 384 of base station 304. For example, the at least one processor 284 of the base station 304 may select orthogonal sequences where there is a high reliability requirement, and may select non-orthogonal sequences where there is a large UCI payload, e.g., where the payload size is larger than floor(log 2(N*M)).

Upon determining, at block 810 to use orthogonal sequences, process 800 may include selecting a non-coherent transmission with orthogonal sequences (block 812), e.g., a non-coherent PUCCH with orthogonal sequences. Means for performing the operation at block 812 may include the at least one WWAN transceiver 350 of device 304. For example, transmitter(s) 354 of the base station 304 may transmit an indication to a UE that non-coherent PUCCH with orthogonal sequences should be used. This indication may be signaled to the UE via RRC, MAC-CE, or DCI signaling. Where the selection is being performed by a UE, such as the UE 302, the UE 302 may transmit the non-coherent PUCCH with orthogonal sequences via transmitter(s) 314.

Upon determining, at block 810, to not to use orthogonal sequences, process 800 may include selecting a non-coherent transmission with non-orthogonal sequences (block 814), e.g., a non-coherent PUCCH with non-orthogonal sequences. Means for performing the operation at block 814 may include the at least one WWAN transceiver 350 of base station 304. For example, transmitter(s) 354 of the base station 304 may transmit an indication to a UE that non-coherent PUCCH with non-orthogonal sequences should be used. This indication may be signaled to the UE via RRC, MAC-CE, or DCI signaling. Where the selection is being performed by a UE, such as the UE 302, the UE 302 may transmit the non-coherent PUCCH with non-orthogonal sequences via transmitter(s) 314.

In some aspects, a base station or gNB determines whether or not a UE supports non-coherent PUCCH, e.g., during a UE capabilities determination phase. If the UE does support this feature, the gNB may enable that feature, e.g., via DCI, RRC, or both. Once enabled, there are several approaches that may be taken:

UE and gNB based. In some aspects, once enabled, the gNB may signal the mapping function that is going to be used for the selection process, e.g., for the decisions made at block 802, block 806, and block 810 of FIG. 8. Both the UE and the gNB will then use this function to select the UCI transmission format, e.g., to select between coherent PUCCH, non-coherent PUCCH with orthogonal sequences, or non-coherent PUCCH with non-orthogonal sequences. That is, the UE uses a process (e.g., process 800) to select the UCI transmission format, and the gNB uses the same process to predict which UCI transmission format the UE will use.

In some aspects, the gNB may configure the UE with the mapping functions and decision methods, parameters, thresholds, etc., for each decision made in a process (e.g., process 800). Where the process considers parameters to which the UE does not have access, the gNB may signal the values of those parameters to the UE so that the UE can make the decisions. Examples of such parameters include pathloss, doppler and delay spreads, etc.

gNB based. In some aspects, the gNB will perform a process (e.g., process 800) select the UCI transmission format signals that selection to the UE, e.g., via DCI, RRC, or MAC-CE. In this aspect, the UE does not perform the process 800 but instead responds to instructions from the gNB, which is performing the process 800. In some aspects, such as where the process 800 is used, the signaling may be simply a set of bits indicating the results of each decision block, with a "1" indicating "yes" and a "0" indicating "no". Using this approach, and presuming that, for $B_0B_1B_2$, $B_0$ maps to decision block 802 (coherent or non-coherent), $B^1$ maps to decision block 806 (RS-aided or not RS-aided), and $B_2$ maps to decision block 810 (orthogonal sequence or non-orthogonal sequence), the following table may be used by the UE and gNB, where "x" means "do not care" about the bit value:

| $B_0B_1B_2$ | Meaning |
|---|---|
| 0 0 0 | non-coherent transmission, without RS, with non-orthogonal sequences |
| 0 0 1 | non-coherent transmission, without RS, with orthogonal sequences |
| 0 1 0 | non-coherent transmission, with RS, with non-orthogonal sequences |
| 0 1 1 | non-coherent transmission, with RS, with orthogonal sequences |
| 1 x x | coherent transmission |

In some aspects, the gNB may configure each UE with the table above, and use RRC to configure every SPS configuration and dynamically change the bit values in activation or reactivation DCI as needed. In some aspects, the gNB may configure a group of SPS configurations via RRC and dynamically change the bit values in activation or reactivation DCI as needed. In some aspects, the gNB may provide all UEs with a general indication, e.g., via RCC, MAC-CE, or DCI, to use the mapping for X slots or subslots, where X could be configured via RCC, MAC-CE, or DCI.

In some aspects, a gNB may provide set of two or more bitmaps, with express or implied conditions under which each should be used, e.g., to use the first bitmap for high priority transmissions and to use the second bitmap for low priority transmissions. In some aspects, certain bitmaps can be associated with specific bandwidth parts, component carriers, slots, or combinations thereof.

UE assisted. In some aspects, the UE may send a preferred configuration for PUCCH coding (e.g., in the form of $B_0B_1B_2$ or other format) or list of preferred configurations, and the gNB will take that into account when making the selection.

In any of the aspects above, any needed information could be signaled from one node to the other, e.g., doppler and delay spread and other channel characteristics could be signaled from UE to gNB using PUCCH or MAC-CE as needed and per gNB request or signaled periodically.

Figure 9:
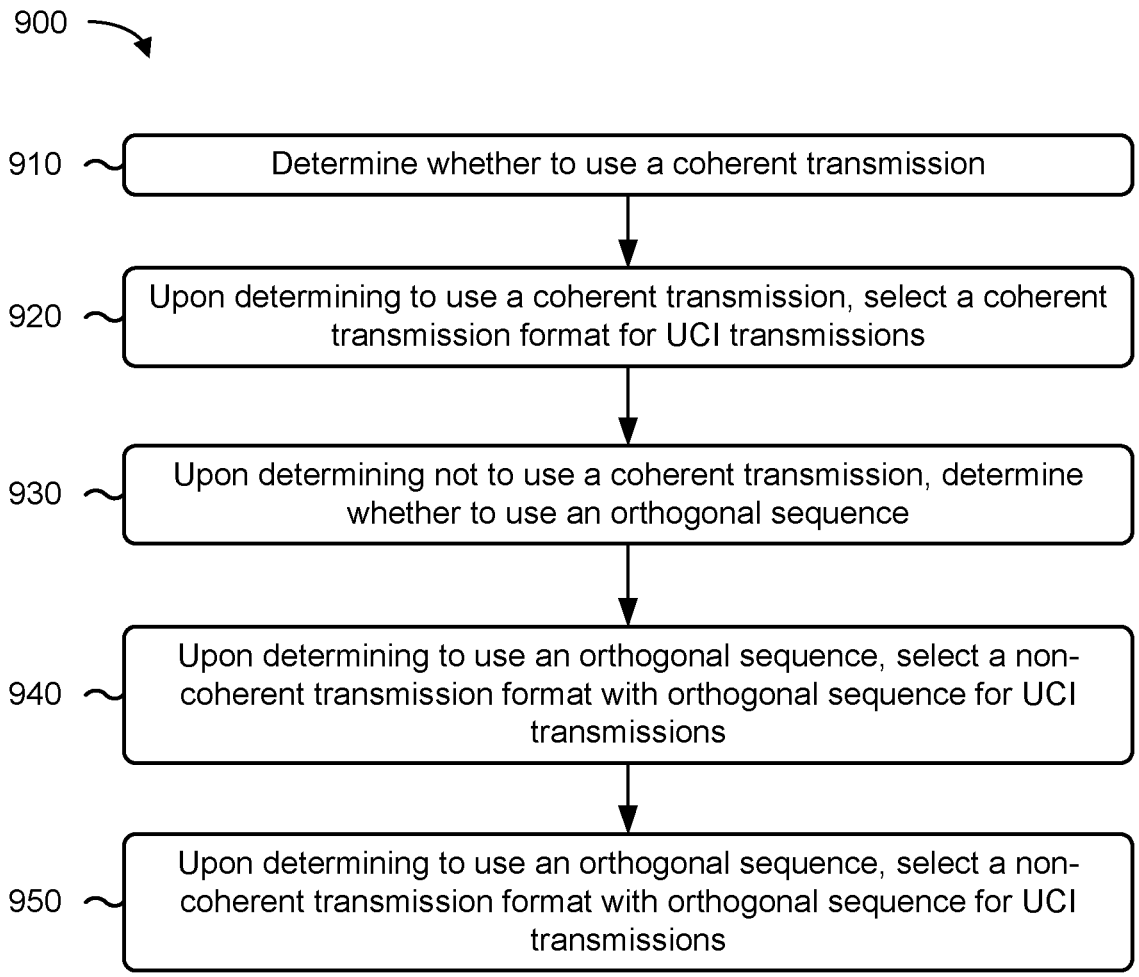
FIG. 9 is a flowchart of another example process associated with selection of a UCI transmission format according to some aspects of the disclosure.

FIG. 9 is a flowchart of an example process 900 associated with uplink control information transmission format selection. In some implementations, one or more process blocks of FIG. 9 may be performed by a network node (e.g., BS 102 or UE 104). In some implementations, one or more process blocks of FIG. 9 may be performed by another device or a group of devices separate from or including the network node. Additionally, or alternatively, one or more process blocks of FIG. 9 may be performed by one or more components of device 302 or device 304, such as processor(s) 332 or 384, memory 340 or 386, WWAN transceiver(s) 310 or 350, user interface 346, network interface(s) 380, and/or UCI format selector(s) 388, any or all of which may be considered means for performing this operation.

As shown in FIG. 9, process 900 may include determining whether to use a coherent transmission (block 910);

As further shown in FIG. 9, process 900 may include, upon determining to use a coherent transmission, selecting a coherent transmission format for UCI transmission (block 920);

As further shown in FIG. 9, process 900 may include, upon determining not to use a coherent transmission: determining whether to use an orthogonal sequence (block 930);

As further shown in FIG. 9, process 900 may include, upon determining to use an orthogonal sequence, selecting a non-coherent transmission format with an orthogonal sequence for UCI transmission (block 940);

As further shown in FIG. 9, process 900 may include, upon determining not to use an orthogonal sequence, selecting a non-coherent transmission format with a non-orthogonal sequence for UCI transmission (block 950).

As further shown in FIG. 9, process 900 may include using the selected format for UCI transmission (block 960). For example, the network node may use the selected format for UCI transmission, as described above.

Process 900 may include additional implementations, such as any single implementation or any combination of implementations described below and/or in connection with one or more other processes described elsewhere herein.

In some aspects, process 900 includes determining whether to use a reference signal (RS)-aided transmission, upon determining to use an RS-aided transmission, selecting a non-coherent transmission format that includes reference signals, and upon determining not to use an RS-aided transmission, selecting a non-coherent transmission format that does not include reference signals.

In some aspects, the network node comprises a base station, and wherein using the selected format for UCI transmission comprises signaling the selected format for UCI transmission to a user equipment (UE).

In some aspects, signaling the selected format for UCI transmission to the UE comprises signaling indicators that indicate selection of coherent transmission or non-coherent transmission, selection of transmission using orthogonal sequence or transmission using non-orthogonal sequence, selection of a RS-aided transmission or a non-RS-aided transmission, or combinations thereof.

In some aspects, signaling the selected format for UCI transmission comprises signaling the selected format for UCI transmission via radio resource control (RRC) signaling, MAC-CE signaling, or downlink control information (DCI) signaling.

In some aspects, signaling the selected format for UCI transmission comprises signaling a plurality of UCI transmission formats and a mapping that maps each of the plurality of UCI transmission formats to a set of one or more conditions.

In some aspects, the mapping maps one of the plurality of UCI transmission formats to high priority transmissions and another of the plurality UCI transmission formats to low priority transmissions.

In some aspects, the network node comprises a base station, and wherein using the selected format for UCI transmission comprises decoding a UCI transmission from a user equipment (UE) using the selected format for UCI transmission.

In some aspects, the network node comprises a user equipment (UE), and wherein using the selected format for UCI transmission comprises transmitting a UCI in the selected format for UCI transmission.

In some aspects, transmitting the UCI in the selected UCI format comprises transmitting a physical uplink control channel (PUCCH) in the selected format for UCI transmission.

In some aspects, the network node comprises a user equipment (UE), and wherein using the selected format for UCI transmission comprises notifying a base station of the selected format for UCI transmission.

In some aspects, notifying the base station of the selected format for UCI transmission comprises sending signaling indicators that indicate selection of coherent transmission or non-coherent transmission, selection of transmission using orthogonal sequence or transmission using non-orthogonal sequence, selection of a RS-aided transmission or a non-RS-aided transmission, or combinations thereof.

In some aspects, notifying the base station of the selected format for UCI transmission comprises signaling the selected format for UCI transmission via radio resource control (RRC) signaling, MAC-CE signaling, or downlink control information (DCI) signaling.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method, performed by a network node, for selection of uplink control information (UCI) transmission format, the method comprising: determining whether to use a coherent transmission; upon determining to use a coherent transmission, selecting a coherent transmission format for UCI transmission; upon determining not to use a coherent transmission: determining whether to use an orthogonal sequence; upon determining to use an orthogonal sequence, selecting a non-coherent transmission format with an orthogonal sequence for UCI transmission; upon determining not to use an orthogonal sequence, selecting a non-coherent transmission format with a non-orthogonal sequence for UCI transmission; and using the selected format for UCI transmission.

Clause 2. The method of clause 1, further comprising, upon determining not to use a coherent transmission: determining whether to use a reference signal (RS)-aided transmission; upon determining to use an RS-aided transmission, selecting a non-coherent transmission format that includes reference signals; and upon determining not to use an RS-aided transmission, selecting a non-coherent transmission format that does not include reference signals.

Clause 3. The method of any of clauses 1 to 2, wherein the network node comprises a base station, and wherein using the selected format for UCI transmission comprises signaling the selected format for UCI transmission to a user equipment (UE).

Clause 4. The method of clause 3, wherein signaling the selected format for UCI transmission to the UE comprises signaling indicators that indicate: selection of coherent transmission or non-coherent transmission; selection of transmission using orthogonal sequence or transmission using non-orthogonal sequence; selection of a RS-aided transmission or a non-RS-aided transmission; or combinations thereof.

Clause 5. The method of any of clauses 3 to 4, wherein signaling the selected format for UCI transmission comprises signaling the selected format for UCI transmission via radio resource control (RRC) signaling, medium access control control element (MAC-CE) signaling, or downlink control information (DCI) signaling.

Clause 6. The method of any of clauses 3 to 5, wherein signaling the selected format for UCI transmission comprises signaling a plurality of UCI transmission formats and a mapping that maps each of the plurality of UCI transmission formats to a set of one or more conditions.

Clause 7. The method of clause 6, where the mapping maps one of the plurality of UCI transmission formats to high priority transmissions and another of the plurality UCI transmission formats to low priority transmissions.

Clause 8. The method of any of clauses 1 to 7, wherein the network node comprises a base station, and wherein using the selected format for UCI transmission comprises decoding a UCI transmission from a user equipment (UE) using the selected format for UCI transmission.

Clause 9. The method of any of clauses 1 to 8, wherein the network node comprises a user equipment (UE), and wherein using the selected format for UCI transmission comprises transmitting a UCI in the selected format for UCI transmission.

Clause 10. The method of any of clauses 7 to 9, wherein transmitting the UCI in the selected UCI format comprises transmitting a physical uplink control channel (PUCCH) in the selected format for UCI transmission.

Clause 11. The method of any of clauses 1 to 10, wherein the network node comprises a user equipment (UE), and wherein using the selected format for UCI transmission comprises notifying a base station of the selected format for UCI transmission.

Clause 12. The method of any of clauses 3 to 11, wherein notifying the base station of the selected format for UCI transmission comprises sending signaling indicators that indicate: selection of coherent transmission or non-coherent transmission; selection of transmission using orthogonal sequence or transmission using non-orthogonal sequence; selection of a RS-aided transmission or a non-RS-aided transmission; or combinations thereof.

Clause 13. The method of any of clauses 3 to 12, wherein notifying the base station of the selected format for UCI transmission comprises signaling the selected format for UCI transmission via radio resource control (RRC) signaling, medium access control control element (MAC-CE) signaling, or downlink control information (DCI) signaling.

Clause 14. An apparatus comprising a memory and at least one processor communicatively coupled to the memory, the memory and the at least one processor configured to perform a method according to any of clauses 1 to 13.

Clause 15. An apparatus comprising means for performing a method according to any of clauses 1 to 13.

Clause 16. A non-transitory computer-readable medium storing computer-executable instructions, the computer-executable comprising at least one instruction for causing a computer or processor to perform a method according to any of clauses 1 to 13.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, performed by a network node, for selection of uplink control information (UCI) transmission format, the method comprising:
    determining whether to use a coherent transmission;
    upon determining to use a coherent transmission, selecting a coherent transmission format for UCI transmission as a selected format for UCI transmission;
    upon determining not to use a coherent transmission:
        determining whether to use an orthogonal sequence based on a size of an assigned resource and a size of UCI payload;
        upon determining to use an orthogonal sequence, selecting a non-coherent transmission format with an orthogonal sequence for UCI transmission as the selected format for UCI transmission; and
        upon determining not to use an orthogonal sequence, selecting a non-coherent transmission format with a non-orthogonal sequence for UCI transmission as the selected format for UCI transmission; and
    using the selected format for UCI transmission.

2. The method of claim 1, further comprising, upon determining not to use a coherent transmission:
    determining whether to use a reference signal (RS)-aided transmission;
    upon determining to use an RS-aided transmission, selecting the selected format for UCI transmission that includes reference signals; and
    upon determining not to use an RS-aided transmission, selecting the selected format for UCI transmission that does not include reference signals.

3. The method of claim 1, wherein the network node comprises a base station, and wherein using the selected format for UCI transmission comprises signaling the selected format for UCI transmission to a user equipment (UE).

4. The method of claim 3, wherein signaling the selected format for UCI transmission to the UE comprises signaling indicators that indicate:
    selection of coherent transmission or non-coherent transmission;
    selection of transmission using orthogonal sequence or transmission using non-orthogonal sequence;
    selection of a RS-aided transmission or a non-RS-aided transmission;
    or combinations thereof.

5. The method of claim 3, wherein signaling the selected format for UCI transmission comprises signaling the selected format for UCI transmission via radio resource control (RRC) signaling, medium access control control element (MAC-CE) signaling, or downlink control information (DCI) signaling.

6. The method of claim 3, wherein signaling the selected format for UCI transmission comprises signaling a plurality of UCI transmission formats and a mapping that maps each of the plurality of UCI transmission formats to a set of one or more conditions.

7. The method of claim 6, wherein the mapping maps one of the plurality of UCI transmission formats to high priority transmissions and another of the plurality UCI transmission formats to low priority transmissions.

8. The method of claim 1, wherein the network node comprises a base station, and wherein using the selected format for UCI transmission comprises decoding a UCI from a user equipment (UE) using the selected format for UCI transmission.

9. The method of claim 1, wherein the network node comprises a user equipment (UE), and wherein using the selected format for UCI transmission comprises transmitting a UCI in the selected format for UCI transmission.

10. The method of claim 9, wherein transmitting the UCI in the selected format for UCI transmission comprises transmitting a physical uplink control channel (PUCCH) in the selected format for UCI transmission.

11. The method of claim 1, wherein the network node comprises a user equipment (UE), and wherein using the selected format for UCI transmission comprises notifying a base station of the selected format for UCI transmission.

12. The method of claim 11, wherein notifying the base station of the selected format for UCI transmission comprises sending signaling indicators that indicate:
    selection of coherent transmission or non-coherent transmission;
    selection of transmission using orthogonal sequence or transmission using non-orthogonal sequence;
    selection of a RS-aided transmission or a non-RS-aided transmission;
    or combinations thereof.

13. The method of claim 11, wherein notifying the base station of the selected format for UCI transmission comprises signaling the selected format for UCI transmission via radio resource control (RRC) signaling, medium access control control element (MAC-CE) signaling, or downlink control information (DCI) signaling.

14. The method of claim 1, wherein the determining whether to use the orthogonal sequence comprises:
    determining to use the orthogonal sequence based on the size of the UCI payload is not greater than a value of floor(log 2(N*M)), M being a number of frequency tones of the assigned resource, and N being a number of OFDM symbols of the assigned resource; and
    determining not to use the orthogonal sequence based on the size of the UCI payload is greater than the value of floor(log 2(N*M)).

15. A network node for selection of uplink control information (UCI) transmission format, comprising:
    a memory;
    a communication interface; and
    at least one processor communicatively coupled to the memory and the communication interface, the at least one processor configured to:
    determine whether to use a coherent transmission;
    upon determining to use a coherent transmission, selecting a coherent transmission format for UCI transmission as a selected format for UCI transmission;
    upon determining not to use a coherent transmission:
        determining whether to use an orthogonal sequence based on a size of an assigned resource and a size of UCI payload;
        upon determining to use an orthogonal sequence, selecting a non-coherent transmission format with an orthogonal sequence for UCI transmission as the selected format for UCI transmission; and
        upon determining not to use an orthogonal sequence, selecting a non-coherent transmission format with a non-orthogonal sequence for UCI transmission as the selected format for UCI transmission; and
    use the selected format for UCI transmission.

16. The network node of claim 15, wherein the at least one processor is further configured to, upon determining not to use a coherent transmission:
    determine whether to use a reference signal (RS)-aided transmission;
    upon determining to use an RS-aided transmission, select the selected format for UCI transmission that includes reference signals; and
    upon determining not to use an RS-aided transmission, select the selected format for UCI transmission that does not include reference signals.

17. The network node of claim 15, wherein the network node comprises a base station, and wherein the at least one processor configured to use the selected format for UCI transmission comprises the at least one processor configured to signal the selected format for UCI transmission to a user equipment (UE).

18. The network node of claim 17, wherein the at least one processor being configured to signal the selected format for UCI transmission to the UE comprises the at least one processor being configured to signal indicators that indicate:
    selection of coherent transmission or non-coherent transmission;
    selection of transmission using orthogonal sequence or transmission using non-orthogonal sequence;
    selection of a RS-aided transmission or a non-RS-aided transmission;
    or combinations thereof.

19. The network node of claim 17, wherein the at least one processor being configured to signal the selected format for UCI transmission comprises the at least one processor being configured to signal the selected format for UCI transmission via radio resource control (RRC) signaling, medium access control control element (MAC-CE) signaling, or downlink control information (DCI) signaling.

20. The network node of claim 17, wherein the at least one processor being configured to signal the selected format for UCI transmission comprises the at least one processor being configured to signal a plurality of UCI transmission formats and a mapping that maps each of the plurality of UCI transmission formats to a set of one or more conditions.

21. The network node of claim 20, where wherein the mapping maps one of the plurality of UCI transmission formats to high priority transmissions and another of the plurality UCI transmission formats to low priority transmissions.

22. The network node of claim 15, wherein the network node comprises a base station, and wherein the at least one processor configured to use the selected format for UCI transmission comprises the at least one processor configured to decode a UCI from a user equipment (UE) using the selected format for UCI transmission.

23. The network node of claim 15, wherein the network node comprises a user equipment (UE), and wherein the at least one processor configured to use the selected format for UCI transmission comprises the at least one processor configured to cause the communication interface to transmit a UCI in the selected format for UCI transmission.

24. The network node of claim 23, wherein the at least one processor being configured to cause the communication interface to transmit the UCI in the selected format for UCI transmission comprises the at least one processor being configured to cause the communication interface to transmit a physical uplink control channel (PUCCH) in the selected format for UCI transmission.

25. The network node of claim 15, wherein the network node comprises a user equipment (UE), and wherein the at least one processor configured to use the selected format for UCI transmission comprises the at least one processor configured to notify a base station of the selected format for UCI transmission.

26. The network node of claim 25, wherein the at least one processor being configured to notify the base station of the selected format for UCI transmission comprises the at least one processor being configured to send signaling indicators that indicate:
selection of coherent transmission or non-coherent transmission;
selection of transmission using orthogonal sequence or transmission using non-orthogonal sequence;
selection of a RS-aided transmission or a non-RS-aided transmission;
or combinations thereof.

27. The network node of claim 25, wherein the at least one processor configured to notify the base station of the selected format for UCI transmission comprises the at least one processor being configured to signal the selected format for UCI transmission via radio resource control (RRC) signaling, medium access control control element (MAC-CE) signaling, or downlink control information (DCI) signaling.

28. The network node of claim 15, wherein the at least one processor configured to determine whether to use the orthogonal sequence comprises the at least one processor further configured to:
determine to use the orthogonal sequence based on the size of the UCI payload is not greater than a value of floor(log 2(N*M)), M being a number of frequency tones of the assigned resource, and N being a number of OFDM symbols of the assigned resource; and
determine not to use the orthogonal sequence based on the size of the UCI payload is greater than the value of floor(log 2(N*M)).

29. A network node for selection of uplink control information (UCI) transmission format, comprising:
means for determining whether to use a coherent transmission;
means for selecting, upon determining to use a coherent transmission, a coherent transmission format for UCI transmission as a selected format for UCI transmission;
means for determining, upon determining not to use a coherent transmission, whether to use an orthogonal sequence based on a size of an assigned resource and a size of UCI payload;
means for selecting, upon determining to use an orthogonal sequence, a non-coherent transmission format with an orthogonal sequence for UCI transmission as the selected format for UCI transmission;
means for selecting, upon determining not to use an orthogonal sequence, a non-coherent transmission format with a non-orthogonal sequence for UCI transmission as the selected format for UCI transmission; and
means for using the selected format for UCI transmission.

30. A non-transitory computer-readable medium storing computer-executable instructions that, when executed by a network node for selection of uplink control information (UCI) transmission format, cause the network node to:
determine whether to use a coherent transmission;
upon determining to use a coherent transmission, select a coherent transmission format for UCI transmission as a selected format for UCI transmission;
upon determining not to use a coherent transmission:
determine whether to use an orthogonal sequence based on a size of an assigned resource and a size of UCI payload;
upon determining to use an orthogonal sequence, select a non-coherent transmission format with an orthogonal sequence for UCI transmission as the selected format for UCI transmission; and
upon determining not to use an orthogonal sequence, select a non-coherent transmission format with a non-orthogonal sequence for UCI transmission as the selected format for UCI transmission; and
use the selected format for UCI transmission.

* * * * *